(12) United States Patent
Ersoy et al.

(10) Patent No.: US 8,571,756 B2
(45) Date of Patent: Oct. 29, 2013

(54) WHEEL SUSPENSION FOR A VEHICLE

(75) Inventors: Metin Ersoy, Walluf (DE); Marc Wiesenthal, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 728 days.

(21) Appl. No.: 12/918,194

(22) PCT Filed: Feb. 26, 2009

(86) PCT No.: PCT/DE2009/050009
§ 371 (c)(1),
(2), (4) Date: Aug. 18, 2010

(87) PCT Pub. No.: WO2009/106072
PCT Pub. Date: Sep. 3, 2009

(65) Prior Publication Data
US 2011/0004374 A1    Jan. 6, 2011

(30) Foreign Application Priority Data
Feb. 29, 2008 (DE) .......................... 10 2008 000 472

(51) Int. Cl.
*B60G 17/018* (2006.01)

(52) U.S. Cl.
USPC .......................................... 701/37; 280/5.52

(58) Field of Classification Search
USPC .......... 701/37, 41, 42, 34.4, 36, 50, 82, 85, 1,
701/31.4, 38, 72, 45, 48, 80, 70; 280/5.52,
280/5.507, 5.5
See application file for complete search history.

(56) References Cited

U.S. PATENT DOCUMENTS

| | | | |
|---|---|---|---|
| 3,498,630 A | 3/1970 | Crawford | |
| 4,700,972 A | 10/1987 | Young | |
| 6,026,338 A * | 2/2000 | Borschert et al. | 701/37 |
| 6,879,240 B2 * | 4/2005 | Kruse | 338/12 |
| 7,036,233 B1 * | 5/2006 | Schindler | 33/1 PT |
| 7,045,999 B2 | 5/2006 | Ersoy et al. | |
| 7,159,890 B2 * | 1/2007 | Craig et al. | 280/511 |

(Continued)

FOREIGN PATENT DOCUMENTS

| DE | 10134259 A1 | 2/2003 |
|---|---|---|
| DE | 102 21 873 A1 | 11/2003 |

(Continued)

*Primary Examiner* — Thomas Black
*Assistant Examiner* — Robert Payne
(74) *Attorney, Agent, or Firm* — Cheryl F. Cohen; Christa Hildebrand

(57) ABSTRACT

Wheel suspension for vehicle, with support, steering knuckle connected in articulated manner with the support via interconnected joints, a vehicle wheel rotatably supported on the steering knuckle, a connecting element extending between a first joint and a second joint which is connected in an articulated manner via the first joint to the steering knuckle and via the second joint to the support, an angle detection device, for measuring the rotation angle of one of the joints and for generating an angle signal characterizing the rotation angle, an evaluation device, for evaluating the angle signal, and which is coupled with the angle detection device. The connecting element is a chassis actuator with an adjusting means, with which the length of the chassis actuator and thereby the position of the vehicle wheel is varied. The length of the chassis actuator is determined with the evaluation device by evaluating the at least one angle signal.

10 Claims, 3 Drawing Sheets

(56) References Cited

U.S. PATENT DOCUMENTS

Figure 1:
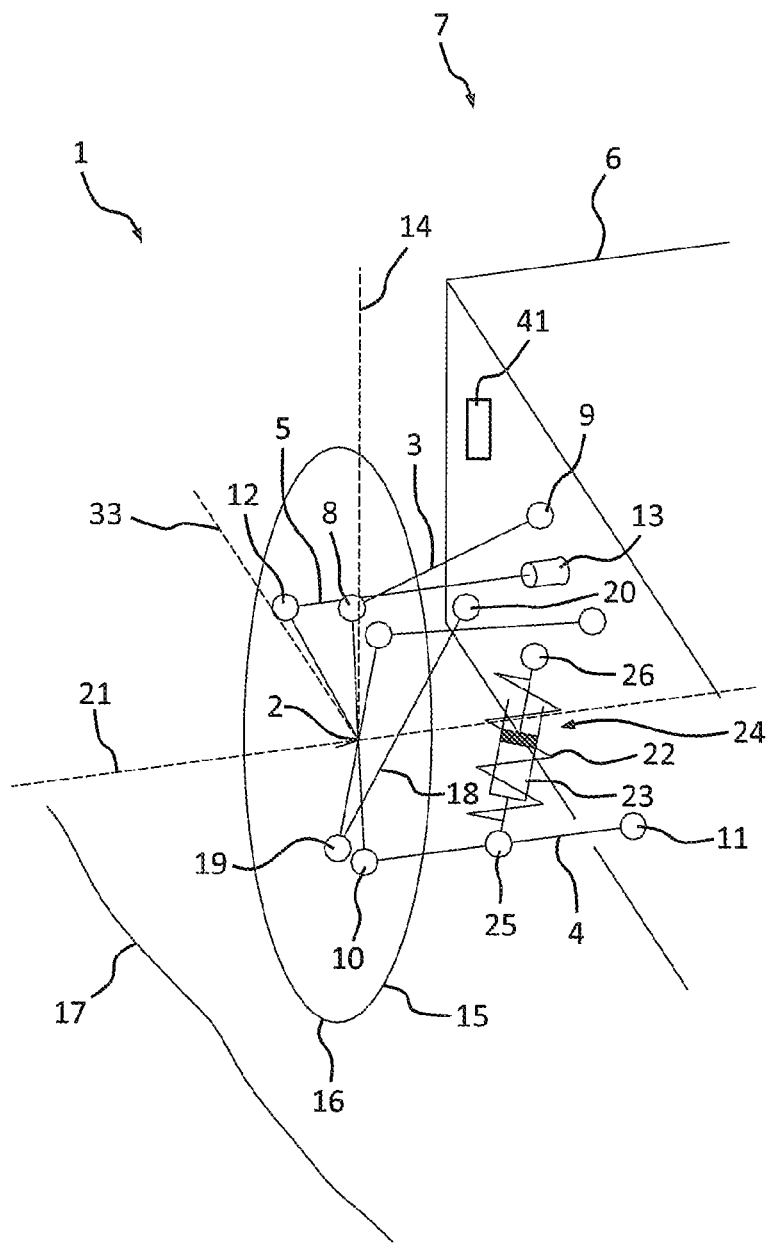

| | | | |
|---|---|---|---|
| 7,221,265 B2* | 5/2007 | Bjorkgard | 340/440 |
| 7,305,864 B2* | 12/2007 | Graber et al. | 73/11.04 |
| 7,405,557 B2* | 7/2008 | Spratte et al. | 324/207.22 |
| 7,570,047 B2* | 8/2009 | Stuve et al. | 324/207.2 |
| 7,648,153 B2* | 1/2010 | Metternich et al. | 280/433 |
| 7,695,212 B2* | 4/2010 | Spratte et al. | 403/135 |
| 7,841,799 B2* | 11/2010 | Spratte et al. | 403/122 |
| 8,116,941 B2* | 2/2012 | Ammon et al. | 701/41 |
| 2011/0010048 A1* | 1/2011 | Messih et al. | 701/37 |

FOREIGN PATENT DOCUMENTS

| | | |
|---|---|---|
| DE | 10 2004 059544 A1 | 6/2006 |
| DE | 10 2000 029 136 A1 | 1/2008 |
| EP | 0 617 260 A | 9/1994 |
| JP | 62 125907 A | 6/1987 |
| WO | 2005/005177 A | 1/2005 |

* cited by examiner

WHEEL SUSPENSION FOR A VEHICLE

This is an application filed under 35 USC §371 of PCT/EP2009/050009, claiming priority to DE 10 2008 000 472.3 filed on Feb. 29, 2008.

BACKGROUND OF THE INVENTION (1) Field of the Invention

The invention relates to a wheel suspension for a vehicle, with a support, a steering knuckle, which is connected in an articulated manner to the support by way of several interconnected joints, a vehicle wheel supported on the steering knuckle for rotation, at least one connecting element which extends between a first of the joints and a second of the joints and which is connected in an articulated manner to the steering knuckle by way of the first joint and to the support by way of the second joint, at least one angle detection device configured to measure at least one rotation angle of at least one of the joints and to generate at least one angle signal characterizing the rotation angle, and an evaluation device which is coupled to the angle detection device and which is or can be used to evaluate the angle signal.

(2) Description of Related Art

DE 102 21 873 A1 discloses a bearing for a control arm of a wheel suspension, wherein at least one sensor arranged in or on the bearing determines the relative movement, such as the rotation, pivoting and/or displacement of the vehicle components connected by the bearing. It is furthermore possible to calculate the spring deflection and rebound of a wheel from the data supplied by the sensor.

DE 101 34 259 A1 discloses a ball joint with a ball joint housing and a ball pin with an articulated ball, wherein the ball pin with the articulated ball is rotatably and pivotally supported in the ball joint housing and protrudes with the pin from the ball joint housing. A two-pole field transducer is provided at one end of the articulated ball facing away from the pin, with the poles being arranged on the ball surface, wherein at least two field sensors are arranged in spaced-apart relationship in the ball joint housing. The ball joint is arranged, in particular, in the chassis of a motor vehicle, so that for example the wheel position, the steering angle or the spring deflection can be determined.

In systems capable of actively adjusting the kinematics of the suspension (e.g., steering, track or camber adjustment), length-adjustable mechanical elements (chassis suspension actuators) are employed, whose adjustment position for controlling the system or identifying the status must be known. Under normal conditions, distance sensors are integrated in the actuators. However, this requires installation space, suitability of the sensors for the specific application and results in higher costs.

On this basis, it is an object of the invention to provide a wheel suspension of the aforedescribed type with a controllable chassis actuator in a most cost-effective and simple manner.

BRIEF SUMMARY OF THE INVENTION

The object is solved by the invention with a wheel suspension according to claim 1 and with a use according to claim 9. Advantageous embodiments of the invention are recited in the dependent claims.

The wheel suspension for a vehicle according to the invention, in particular a motor vehicle, has a support, a steering knuckle, which is connected to the support in an articulated manner by several interconnected joints, a vehicle wheel supported on the steering knuckle for rotation, at least one connecting element which extends between a first of the joints and a second of the joints and which is connected in an articulated manner to the steering knuckle by way of the first joint and to the support by way of the second joint, at least one angle detection device, which is or can be used to measure the at least one rotation angle of at least one of the joints and to generate at least one angle signal characterizing the rotation angle, and an evaluation device coupled to the angle detection device, with which the angle signal is or can be evaluated, wherein the connecting element is a chassis actuator with an adjusting means, by which the length of the chassis actuator and consequently the position of the vehicle wheel can be varied, and wherein the length of the chassis actuator is determined or can be determined with the evaluation device by evaluating the at least one angle signal.

According to the invention, the existing angle detection device is employed for measuring the length of the chassis actuator, thus obviating the need for additional distance sensors.

The support is preferably formed by a chassis of the vehicle. An auxiliary frame or a subframe is here considered to be part of the chassis, if this support is formed by a subframe or auxiliary frame attached to the chassis. Alternatively, the support can also be formed by the axle shaft of a vehicle axle, in particular a rigid axle suspended from the chassis of a vehicle, if the vehicle has such an axle.

Preferably, a control arm, preferably a transverse control arm, is provided which extends between a third of the joints and a fourth of the joints and which is connected in an articulated manner to the steering knuckle by way of a third joint and to the support by way of the fourth joint.

Preferably, several, for example two or three, rotation angles of the at least one joint can be measured with the (first) angle detection device. If this joint is a ball joint, which has a housing with a ball pin rotatably supported therein, then the position of the ball pin relative to the housing is typically defined by two pivot angles describing the rotation of the ball pin perpendicular to its longitudinal direction, and a rotation angle describing a rotation of the ball pin about its longitudinal direction. The angle detection device is now able to measure, depending on its configuration, one, two or three of these angles. However, if this joint is a rubber bearing with an inner part, an outer sleeve surrounding the inner part, and a rubber body arranged between the inner part and the outer part, then particularly a rotation of the inner part relative to the outer sleeve can be measured with the angle detection device.

Preferably, the wheel suspension has at least one additional angle detection device, with which the at least one other rotation angle of at least one other of the joints can be measured and at least one other angle signal characterizing the other rotation angle is or can be generated. In particular, the length of the chassis actuator can additionally be determined with the evaluation device by evaluating the at least one other angle signal. Preferably, several, for example two or three, rotation angles of the other joint can be measured with the other detection device. If the other joint is a ball joint or a rubber bearing, then the previous discussion relating to the first angle detection device is her also applicable.

In particular, the or each of the angle detection devices is integrated in one of the joints, so that the first angle detection device is preferably integrated into the at least one joint and/or of the other angle detection device is preferably integrated in the other joint.

According to an advantageous embodiment, the respective joints are implemented as a ball joint or rubber bearing.

The length of the chassis actuator is can be determined from the angle signal(s). Preferably, the length of the chassis actuator is determined with the evaluation device by using at least one characteristic diagram, which is stored, for example, in the evaluation device. The characteristic diagram is determined, for example, ahead of time and associates a length of the chassis actuator with one or more of the angle signals. In particular, the characteristic diagram is stored in a memory which is, for example, part of the evaluation device. The evaluation device has preferably a digital computer which evaluates the signals. The angle signals are, in particular, electrical signals.

In particular, the chassis actuator can be used to vary the track and/or the camber of the vehicle wheel. For example, the chassis actuator may be a tie rod with which the track or toe-in of the vehicle wheel can be adjusted. Alternatively, the chassis adjustment may be a control arm, in particular a transverse control arm, with which the camber of the vehicle wheel can be varied.

The adjusting means is used, in particular, for automatic adjustment of the length of the chassis actuator and preferably includes a drive. The chassis actuator is hence preferably an active chassis actuator. The drive may be constructed and/or operated hydraulically. Preferably, the drive is electric and in particular includes an electric motor.

The invention also relates to the use of at least one angle detection device, by which the at least one rotation angle of at least one joint in a wheel suspension of a vehicle is measured and at least one angle signal characterizing the rotation angle is generated, for determining the length of a chassis actuator having an adjustable length and used to connect a steering knuckle supporting a vehicle wheel in an articulated manner. The wheel suspension is particularly a wheel suspension according to the invention which can be embodied according to all embodiments described in this context. Preferably, the track and/or camber of the vehicle wheel are varied by adjusting the length of the chassis actuator.

According to the invention, angle sensors (angle detection devices) are combined with the chassis actuator(s), thereby obviating the need to integrate additional distance sensors in the chassis actuators, which are employed, for example, in an active kinematic system. In particular, the angle sensors may be integrated in ball joints or rubber joints. The measured angles then allow inference about the position of the steering knuckle, wherefrom the length of the chassis actuator(s) can be determined at least with the help of a characteristic diagram.

With the invention, conventionally used distance sensors in active chassis components can be replaced with angle sensors. The distance sensors then need to no longer be integrated in the assembly of the chassis actuator, which reduces the installation space which then can be used for other purposes. Also eliminated are electric/electronic components in the hydraulic area of the system, if the chassis actuator or its adjusting means is operated hydraulically. In addition, the conventional use of distance sensors only measures the actuator position or the length of the chassis actuator, whereas the angle sensors are capable of measuring additionally the position of other components of the chassis and hence offer multiple functionality.

A preferred exemplary embodiment of the invention of the invention will be described with reference to the drawing, which shows in:

BRIEF DESCRIPTION OF THE INVENTION

Figure 2:
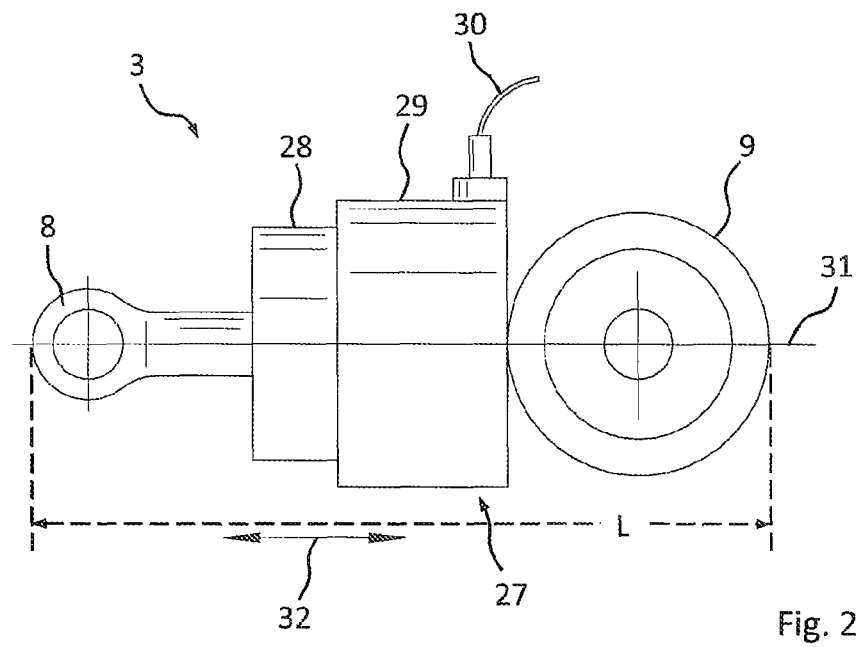
Figure 3:
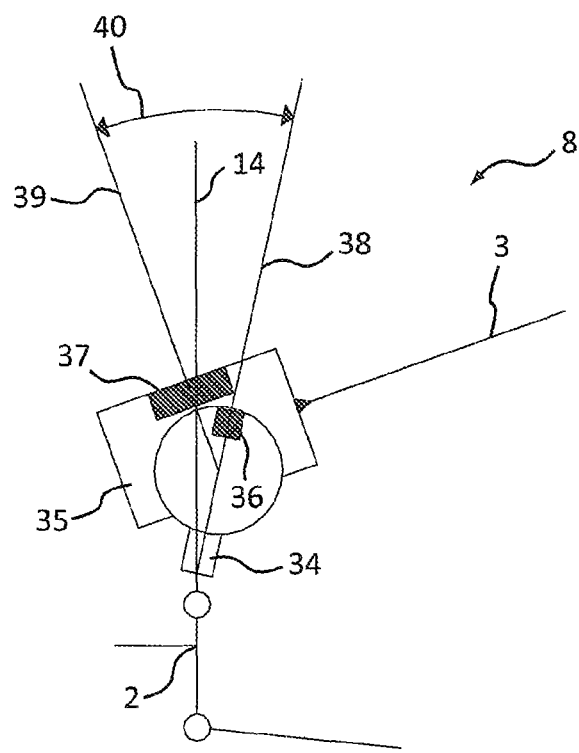
Figure 4:
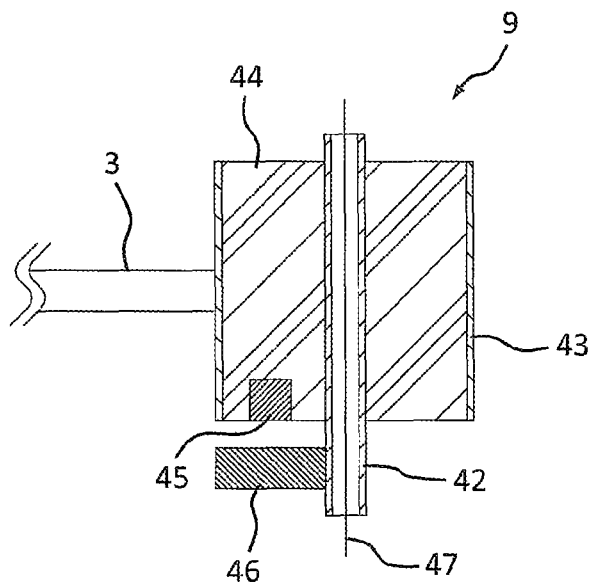
Figure 5:
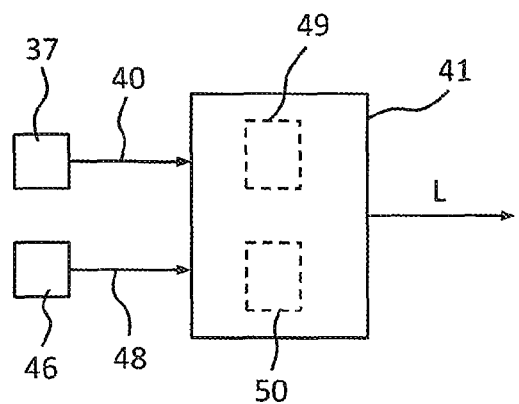

FIG. 1 a schematic diagram of a wheel suspension according to one embodiment of the invention, FIG. 2 a side view of a transverse control arm of FIG. 1, FIG. 3 a schematic diagram of a ball joint of FIG. 1 with integrated angle detection device, FIG. 4 a schematic diagram of a rubber bearing of FIG. 1 with integrated angle detection device, and FIG. 5 a schematic block diagram with the evaluation device of FIG. 1.

DETAILED DESCRIPTION OF THE INVENTION

FIG. 1 shows a schematic view of a wheel suspension 1 according to one embodiment of the invention, wherein the wheel support (steering knuckle) 2 is connected with the chassis 6 of a partially illustrated vehicle 7 by way of an upper transverse control arm 3, a lower transverse control arm 4 and a tie rod 5. The upper transverse control arm 3 is connected with the wheel support 2 by way of a ball joint 8 and with the chassis 6 by way of a rubber bearing 9. The lower transverse control arm 4 is connected with the wheel support 2 by way of a ball joint 10 and with the chassis 6 by way of a rubber bearing 11. In addition, the tie rod 5 is connected with the wheel support 2 by way of a ball joint 12 and with the chassis 6 by way of a schematically illustrated steering gear 13, whereby the tie rod 5 is movable in its longitudinal direction by the steering gear 13. The movement of the tie rod 5 causes a rotation of the wheel support 2 about a steering axis 14.

A tire or a wheel 15, which is a contact with a schematically illustrated road surface 17 at a wheel contact point 16, is rotatably supported on the wheel support 2. Moreover, the wheel support 2 is connected with the chassis 6 by way of a radius arm 18, which is coupled or attached by way of a ball joint 19 to the wheel support 2 and by way of a rubber bearing 20 to the chassis 6. The wheel suspension 1 is part of a schematically illustrated steerable front axle 21 which is implemented as a four-link front axle.

The lower transverse control arm 4 is additionally connected with the chassis 6 by way of a vehicle spring 22 and a shock absorber 23, with the spring 22 and the shock absorber 23 together forming a spring damping unit 24 which is attached by way of a joint 25 to the lower transverse control arm 4 and by way of a joint 26 to the chassis 6.

FIG. 2 shows a schematic side view of the transverse control arm 3 which includes adjusting means 27 having a first component 28 connected with the ball joint 8 and a second component 29 connected with a rubber bearing 9. The adjusting means 27 is implemented as an electric adjusting drive and is supplied with electric energy via an electric line 30 and controls. By operating the adjusting means 27, the first component 28 can be moved relative to the second component 29 in a longitudinal direction 31 of the control arm 3, which causes a change in the length L of the transverse control arm 3. Depending on the control of the adjusting means 27, the transverse control arm 3 can be lengthened and/or shortened, as indicated by the arrow 32. When the transverse control arm 3 is lengthened, the distance between the ball joint 8 and the rubber bearing 9 increases; conversely, when the transverse control arm 3 is shortened, the distance between the ball joint 8 and the rubber bearing 9 decreases. The vehicle wheel 15 then pivots about the straight line 33, causing a change in the camber.

FIG. 3 shows a schematic view of the ball bearing 8, which has a ball pin 34 and a ball bearing housing 35, in which the ball pin 34 is rotatably and pivotally supported. A permanent magnet 36 is arranged in the ball pin 34, whereas a magnetic field-sensitive sensor assembly 37 is arranged in the ball bearing housing 35. The magnet 36 and the sensor assembly 37 together form an angle detection device which is integrated in the ball joint 8. The ball bearing housing 35 is rigidly connected to the upper transverse control arm 3, and the ball pin 34 is rigidly connected to the wheel support 2, wherein the longitudinal axis 38 of the ball pin 34 includes an angle 40 with the longitudinal axis 39 of the housing 35. Because the magnetic field produced by the magnet 36 changes at the location of the sensor assembly 37 commensurate with different angles 40, the sensor assembly 37 can supply an electric signal characterizing the angle 40 to an electronic evaluation device 41 (see FIG. 5) for determining the length L of the upper control arm 3.

FIG. 4 shows a schematic diagram of the rubber bearing 2, which has an inner part 42 and an outer sleeve 43 surrounding the inner part 42, wherein between the inner part 42 and the outer sleeve 43 a rubber body 44 is located which is fixedly connected with both the inner part 42 and with the outer sleeve 43. A permanent magnet 45 is disposed in the rubber body 44, and a magnetic field-sensitive sensor 46, which together with the magnet 45 forms a second angle detection device, is attached on the inner part 42. The outer sleeve 43 is fixedly connected to the upper transverse control arm 3, and the inner part 42 is fixedly connected to the chassis 6, wherein the control arm 3 together with the outer sleeve 43 can pivot about the longitudinal axis 47 of the inner part 42. This deforms the rubber body 44 and causes a movement of the magnet 45 relative to the sensor 46. Because of the magnetic field produced by the magnet 45 at the location of the sensor 46 is changed as a result, the sensor can supply an electric signal characterizing the pivot angle 48 (see FIG. 5) to the electronic evaluation device 41.

FIG. 5 shows a schematic block diagram, wherein the evaluation device 41 receives from the sensor assembly 47 a signal characterizing the angle 40 and from the sensor 46 a signal characterizing the angle 48. The evaluation device 41 determines the length L of the control arm 3 based on these signals and based on a characteristic diagram stored in a memory 49. The evaluation device 41 includes for this purpose a digital computer 50.

| | List of reference symbols |
|---|---|
| 1 | Wheel suspension |
| 2 | Wheel support/steering knuckle |
| 3 | Upper transverse control arm/chassis actuator |
| 4 | Lower transverse control arm |
| 5 | Tie rod |
| 6 | Chassis |
| 7 | Vehicle |
| 8 | Ball joint |
| 9 | Rubber bearing |
| 10 | Ball joint |
| 11 | Rubber bearing |
| 12 | Ball joint |
| 13 | Steering gear |
| 14 | Steering axis |
| 15 | Wheel |
| 16 | Wheel contact point |
| 17 | Road surface |
| 18 | Radius arm |
| 19 | Ball joint |
| 20 | Rubber bearing |
| 21 | Vehicle axis |
| 22 | Vehicle spring |
| 23 | Shock absorber |
| 24 | Spring damping unit |
| 25 | Joint |
| 26 | Joint |
| 27 | Adjusting means |
| 28 | First component |
| 29 | Second component |

-continued

| | List of reference symbols |
|---|---|
| 30 | Electric line |
| 31 | Longitudinal direction of the upper transverse control arm |
| 32 | Arrow |
| 33 | Straight line |
| 34 | Ball pin |
| 35 | Ball bearing housing |
| 36 | Permanent magnet |
| 37 | Sensor assembly |
| 38 | Longitudinal axis of the ball pin |
| 39 | Longitudinal axis of the ball bearing housing |
| 40 | Angle |
| 41 | Evaluation device |
| 42 | Inner part |
| 43 | Outer sleeve |
| 44 | Rubber body |
| 45 | Permanent magnet |
| 46 | Sensor |
| 47 | Longitudinal axis of the inner part |
| 48 | Pivot angle |
| 49 | Memory/characteristic diagram |
| 50 | Digital computer |
| L | Length of the chassis actuator |

The invention claimed is:

1. A wheel suspension for a vehicle, with
a support (6),
a steering knuckle (2) which is connected in an articulated manner with the support (6) by way of several interconnected joints (8, 9, 10, 11),
a vehicle wheel (15) which is rotatably supported on the steering knuckle (2), at least one connecting element (3) which extends between a first of the joints (8) and a second of the joints (9) and which is connected in an articulated manner by way of the first joint (8) to the steering knuckle (2) and by way of the second joint (9) to the support (6),
at least one angle detection device (36, 37), with which the at least one rotation angle (40) of at least one of the joints (8) can be measured and at least one angle signal characterizing the rotation angle (40) is or can be generated,
an evaluation device (41), with which the angle signal is or can be evaluated, coupled with the angle detection device (36, 37),
wherein the connecting element (3) is a chassis actuator with an adjusting means (27), with which the length (L) of the chassis actuator (3) and thereby the position of the vehicle wheel (15) can be varied, wherein the length (L) of the chassis actuator (3) is or can be determined with the evaluation device (41) by evaluating the at least one angle signal (40).

2. The wheel suspension according to claim 1, wherein the support (6) is a body of the vehicle.

3. The wheel suspension according to claim 1, wherein at least one control arm (4) which extends between the third of the joints (10) and a fourth of the joints (11) and which is connected in an articulated manner with by way of third joint (10) to the steering knuckle (2) and by way of the fourth joint (11) to the support (6).

4. The wheel suspension according to one of the preceding claims, wherein at least one other angle detection device (45, 46), with which at least one other rotation angle (48) of at least one other of the joints (9) can be measured and at least one other angle signal characterizing the other rotation angle (48) can be generated, wherein the length (L) of the chassis actuator (3) is determinable with the evaluation device (41) additionally by evaluating the at least one other angle signal.

5. The wheel suspension according to claim 1, wherein each of the angle detection devices is integrated in one of the joints (8, 9).

6. The wheel suspension according to claim 1, wherein the joints (8, 9) are configured as a ball joint or as a rubber bearing.

7. The wheel suspension according to claim 1, wherein the length (L) of the chassis actuator (3) is or can be determined with the evaluation device (41) by using a characteristic diagram (49) which is stored in a memory (49).

8. The wheel suspension according to claim 1, wherein the track and/or camber of the vehicle wheel (15) can be varied with the chassis actuator (3).

9. A method of using at least one angle detection device (36, 37), comprising the steps of
    measuring at least one rotation angle (40) of at least one joint (8) in a wheel suspension (1) of a vehicle (7) and generating at least one angle signal characterizing the rotation angle (40),
    determining the length of a chassis actuator (3) whose length is capable of being adjusted and by way of which a steering knuckle (2) supporting a vehicle wheel (15) is connected to a support (6) in an articulated manner.

10. The method according to claim 9, wherein the track and/or camber of the vehicle wheel (15) is capable of being varied by adjusting the length (L) of the chassis actuator (3).

\* \* \* \* \*